（12）United States Patent
Fang et al.

(10) Patent No.: US 8,602,603 B2
(45) Date of Patent: Dec. 10, 2013

(54) BACKLIGHT MODULE AND DISPLAY APPARATUS

(75) Inventors: Lindong Fang, Shenzhen (CN); Yicheng Kuo, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 307 days.

(21) Appl. No.: 12/995,582

(22) PCT Filed: Sep. 30, 2010

(86) PCT No.: PCT/CN2010/077551
§ 371 (c)(1),
(2), (4) Date: Dec. 1, 2010

(87) PCT Pub. No.: WO2012/006821
PCT Pub. Date: Jan. 19, 2012

(65) Prior Publication Data
US 2012/0014134 A1    Jan. 19, 2012

(30) Foreign Application Priority Data

Jul. 14, 2010 (CN) .......................... 2010 1 0230797

(51) Int. Cl.
*F21V 3/00* (2006.01)
(52) U.S. Cl.
USPC ...................... 362/311.01; 362/612; 362/613

(58) Field of Classification Search
USPC .................................................. 362/612, 613
See application file for complete search history.

(56) References Cited

U.S. PATENT DOCUMENTS

| | | | | |
|---|---|---|---|---|
| 5,381,309 A | * | 1/1995 | Borchardt | ..... 362/612 |
| 7,837,374 B2 | * | 11/2010 | Hsu et al. | ..... 362/612 |
| 2008/0158478 A1 | * | 7/2008 | Hsiao et al. | ..... 349/65 |

FOREIGN PATENT DOCUMENTS

| | | |
|---|---|---|
| CN | 101673006 A | 3/2010 |
| JP | 2000284282 A | 10/2000 |
| JP | 2005242249 A | 9/2005 |
| JP | 2005268021 A | 9/2005 |
| JP | 2008262766 A | 10/2008 |
| JP | 2009244485 A | 10/2009 |

* cited by examiner

*Primary Examiner* — Evan Dzierzynski
(74) *Attorney, Agent, or Firm* — Ditthavong Mori & Steiner, P.C.

(57) ABSTRACT

The present invention provides a backlight module and a display apparatus. The display apparatus comprises the backlight module and a display panel. The backlight module comprises a light guide plate and a light source. The light guide plate has an out light surface. The light source is positioned at a side of the light guide plate, wherein the light source comprises a light source out light surface, and a predetermined angle exists between the light source out light surface and the out light surface of the light guide plate. The present invention is capable of promoting the light leakage issue.

9 Claims, 4 Drawing Sheets

BACKLIGHT MODULE AND DISPLAY APPARATUS

BACKGROUND OF THE INVENTION

1. Field of the Invention

The present invention generally relates to a backlight module and a liquid, and more particularly to a LED backlight module capable of raising the usage rate of LEDs.

2. Description of Prior Art

Liquid crystal display (LCD) is widely used in kinds of electronic products. Most of the Liquid crystal displays are backlight type LCDs, which comprises a display panel and a backlight module. The backlight modules can be categorized into a side lighting type and a direct light type to provide the backlight to the liquid crystal display panel according to the different light source position.

The side lighting type backlight module of prior art generally utilizes a light guide plate for guiding the light of the light source. The light source of the backlight module is positioned at a side of the light guide plate. However, partial of the light may leak from the backlight module, i.e. the light leakage situation, and more particularly, the light leakage occurs around the position of the light source when the light source emits the light to the light guide plate. Therefore, the display quality of the liquid crystal display is seriously affected.

Consequently, there is a need to provide a backlight module and a display apparatus to solve the existing issues of prior art.

SUMMARY OF THE INVENTION

An objective of the present invention is to provide a display apparatus, comprising:
a display panel; and
a backlight module, comprising:
  a light guide plate, having an out light surface; and
  a light source, positioned at a side of the light guide plate, wherein the light source comprises a light source out light surface, and a predetermined angle exists between the light source out light surface and the out light surface of the light guide plate, and the predetermined angle is smaller than or equal to 105 degrees;
  wherein the backlight module further comprises a housing having a housing tilted surface for installing the light source, and an angle exists between the housing tilted surface and the out light surface of the light guide plate, which equals to the predetermined angle.

Another objective of the present invention is to provide a display apparatus, comprising:
a display panel; and
a backlight module, comprising:
  a light guide plate, having an out light surface; and
  a light source, positioned at a side of the light guide plate, wherein the light source comprises a light source out light surface, and a predetermined angle exists between the light source out light surface and the out light surface of the light guide plate, and the predetermined angle is smaller than or equal to 105 degrees.

Another objective of the present invention is to provide a backlight module, comprising:
a light guide plate, having an out light surface; and
a light source, positioned at a side of the light guide plate, wherein the light source comprises a light source out light surface, and a predetermined angle exists between the light source out light surface and the out light surface of the light guide plate, and the predetermined angle is smaller than or equal to 105 degrees.

In one embodiment of the present invention, the light source out light surface of the light source is perpendicular to an incident direction of a light entering the light guide plate.

In one embodiment of the present invention, the light source comprises a LED chip and the light source out light surface is formed on a surface of the LED chip.

In one embodiment of the present invention, the predetermined angle is determined according to a material of the light guide plate.

In one embodiment of the present invention, the material of the light guide plate is Polymethylmethacrylate and the predetermined angle is smaller than or equal to 95.68 degrees.

In one embodiment of the present invention, the material of the light guide plate is Polycarbonate and the predetermined angle is smaller than or equal to 101.82 degrees.

In one embodiment of the present invention, the backlight module further comprises a housing having a housing tilted surface for installing the light source, and an angle exists between the housing tilted surface and the out light surface of the light guide plate, which equals to the predetermined angle.

In one embodiment of the present invention, the light source further comprises a lead frame for tilting the light source.

In one embodiment of the present invention, the backlight module further comprises a back plate having a back plate tilted surface for installing the light source, and an angle exists between the back plate tilted surface and the out light surface of the light guide plate, which equals to the predetermined angle.

The backlight module and the display apparatus of the present invention can change the incident direction of the light entering the light guide plate through the position arrangement of the light source to reduce the issue of the light leakage of the light guide plate around the light source. Accordingly, the light leakage issue of the backlight module can be promoted and the display quality of the display apparatus which utilizes the backlight module can be ensured.

For a better understanding the aforementioned content of the present invention, preferable embodiments are illustrated in accordance with the attached figures for further explanation:

DETAILED DESCRIPTION OF THE INVENTION

The following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In figures, the elements with similar structures are indicated by the same number.

Figure 1:
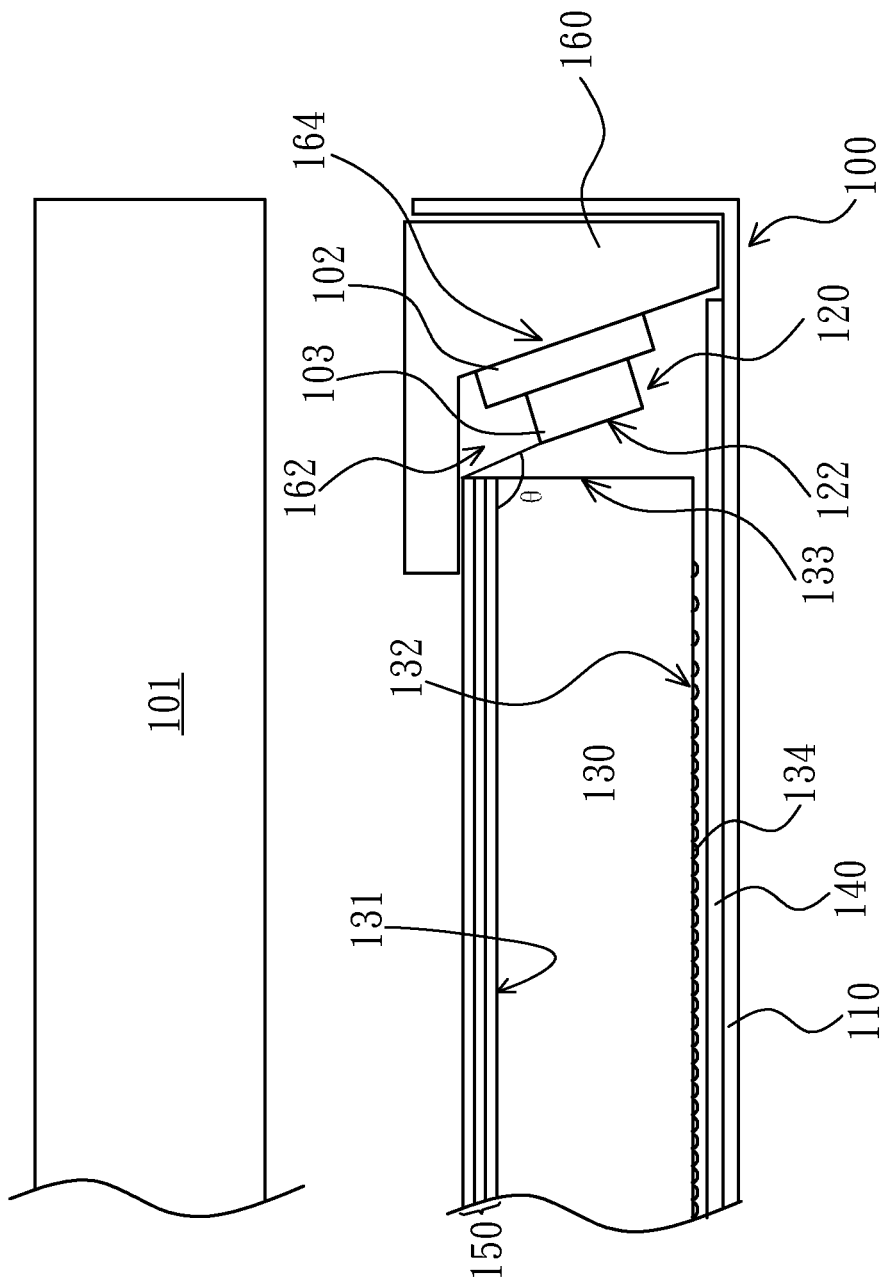
FIG. 1 shows a partial sectional diagram of a backlight module and a display apparatus according to the first embodiment of the present invention.

Please refer to FIG. 1, which shows a partial sectional diagram of a backlight module and a display apparatus according to the first embodiment of the present invention. The backlight module 100 of this embodiment can be a side light type backlight module for instance and positioned relative to a display panel 101 (Such as a LCD panel) for constituting the display apparatus (Such as a LCD apparatus). The backlight module 100 comprises a back plate 110, a light source 120, a light guide plate 130, a reflection layer 140, an optical film 150 and a housing 160. The light guide plate 130, the reflection layer 140 and the optical film 150 are held up on the back plate 110. The light source 120 can be positioned at a side or at opposite two sides of the light guide plate 130 for laterally emitting light to the interior of the light guide plate 130 and then the out light is guided by the light guide plate 130. The reflection layer 140 is installed at the bottom of the light guide plate 130 to reflect the light emitting into the light guide plate 130. The optical film 150 is installed on light guide plate 130 for promoting the optical effect. The housing 160 is installed on the back plate 110 to constituting the backlight module 100.

As shown in FIG. 1, the back plate 110 of this embodiment, can be manufactured by non transparent material, for example, plastic material, metal material or the combinations thereof. For example, the light source 120, can be a cold cathode fluorescent Lamp (CCFL), a light emitting diode (LED), an organic light emitting diode (OLED), an electroluminescence (EL), a light bar or the combinations thereof.

As shown in FIG. 1, in this embodiment, the light sources 120, for example, can be a light bar comprising circuit board 102 and a light-emitting component 103 (such as LED chip). For example, the circuit board 102 can be printed circuit board (PCB) or flexible printed circuit (FPC). The light-emitting component 103 is installed on the circuit board 102. The light source 120 has a light source out light surface 122 for emitting the light to the interior of the light guide plate 130. The light source out light surface 122 is preferably a plane, for example to be formed on the surface of the light-emitting component (such as LED chip). Meanwhile, the light source out light surface 122 of the light source 120 is preferably perpendicular to the direction of the light generated by the light source 120 (i.e. the incident direction of the light entering the light guide plate).

As shown in FIG. 1, the light guide plate 130 is positioned on the back plate 110 and at a side of the light source 120 for guiding the light of the light source 120. For example, the light guide plate 130 of this embodiment can be manufactured by injection mold as a plate structure. For example, the material can be photocurable resin, Polymethylmethacrylate (PMMA), or Polycarbonate (PC). The light guide plate 130 comprises an out light surface 131, a light reflecting surface 132 and a side light incident surface 133. The out light surface 131 is at the front side of the light guide plate 130 to let the light emitted from the light guide plate 130 to the display panel 101. The light reflecting surface 132 is at the bottom of the light guide plate 130 opposite to the out light surface 131. The side light incident surface 133 of the light guide plate 130 is formed on one side or opposite two sides of the light guide plate 130 and faces the light source out light surface 122 of the light source 120 for letting the light emitted by the light source 120 enter the interior of the light guide plate 130. The side light incident surface 133 can be substantially perpendicular to out light surface 131. A predetermined angle θ exists between the light source out light surface 122 of the light source 120 and the out light surface 131 of the light guide plate 130. The predetermined angle θ is preferably smaller than or equal to 105 degrees. Besides, the side light incident surface 133 can comprise V shaped structures (V-cut), S shaped wave structures or surface roughening (not shown) for example, to raise the incidence efficiency and the optical coupling efficiency of the light.

In this embodiment, the predetermined angle θ between the light source out light surface 122 of the light source 120 and the out light surface 131 of the light guide plate 130 can be determined according to a material of the light guide plate 130 or the condition of the real optical design for realizing the optimal optical effect. For example, as the material of the light guide plate 130 is Polymethylmethacrylate (PMMA), the predetermined angle is smaller than or equal to 95.68 degrees. For another example, as the material of the light guide plate 130 is Polycarbonate (PC), the predetermined angle is smaller than or equal to 101.82 degrees.

As shown in FIG. 1, a light guide structure 134 can be formed on the light reflecting surface 132 to reflect the light emitted from the light source 120 through the out light surface 131 and the light is preferably normally emitted (normal out light). For example, the light guide structure 134 of the light guide plate 130 can be continuous V shaped structures, i.e. V-cut structures (For example formed by injection mold or micromachining), matt finished structures (for example, formed by sandblast process) or scattering pod structures (for example formed by screen print, laser fine machining or one-body shaped) for guiding the light emitted into the light guide plate 130 through the side light incident surface 133 to be fully emitted out of the out light surface 131.

Significantly, the out light surface 131 of the light guide plate 130 can comprises a matt finished or a scattering pod design to equalize the out light of the light guide plate 130 for reducing the mura phenomenon.

As shown in FIG. 1, for example, the reflection layer 140 can be a reflection film or reflection coated layer with high reflectivity material to reflect the light traveling to the light reflecting surface 132. For example, the high reflectivity material can be Argentum, Aluminium, Aurum, Chromium, Copper, Indium, Iridium, Niccolum, Platinum, Rhenium, Rhodium, Stannum, Tantalum, Wolfram, Cobaltum, the alloy of the aforesaid materials, white reflection paint of yellowing resistance, heat resisting, or any combination of the aforesaid materials to reflect the light. Significantly, the light reflecting surface 132 of the light guide plate 130 also can be coated by the aforesaid high reflectivity material to reflect the light. Accordingly, the reflection layer 140 can be replaced or omitted further.

As shown in FIG. 1, the optical film 150, for example, can be a diffusion sheet, a prism sheet, a turning prism sheet, a brightness enhancement film (BEF), dual brightness enhancement film (DBEF), diffused reflective polarizer film (DRPF), or the combinations thereof. The optical film 150 is positioned on the out light surface 131 of the light guide plate 130 to promote the optical effect of the out light of the light guide plate 130.

As shown in FIG. 1, the housing 160 of this embodiment can be utilized to assemble the light source 120, the light guide plate 130 and the optical film 150 on the back plate 110. The housing 160 can form a sealed-constructed lamp shade to prevent the light leaking from the portion outside the light guide plate 130. The housing 160 can be manufactured by non transparent material, for example, plastic material, metal material or the combinations thereof. The housing 160 can comprise a chamber 162 formed at a side of the light guide plate 130 to accept the light source 120. The inner side wall of the chamber 162 can be coated with high reflectivity material to reflect the light, which is not emitted into the light guide plate 130 to re-reflect into the interior of the light guide plate 130.

In this embodiment, the housing 160 can comprise a housing tilted surface 164 to form the inner side wall of the chamber 162 of the housing 160. An angle exists between the housing tilted surface 164 and the out light surface 131 of the light guide plate 130 and equals to the aforesaid predetermined angle θ for attaching and installing the light source 120. Therefore, the predetermined angle θ can exist between the light source out light surface 122 of the light source 120 and the out light surface 131 of the light guide plate 130 with the housing tilted surface 164 of the housing 160.

Figure 2:
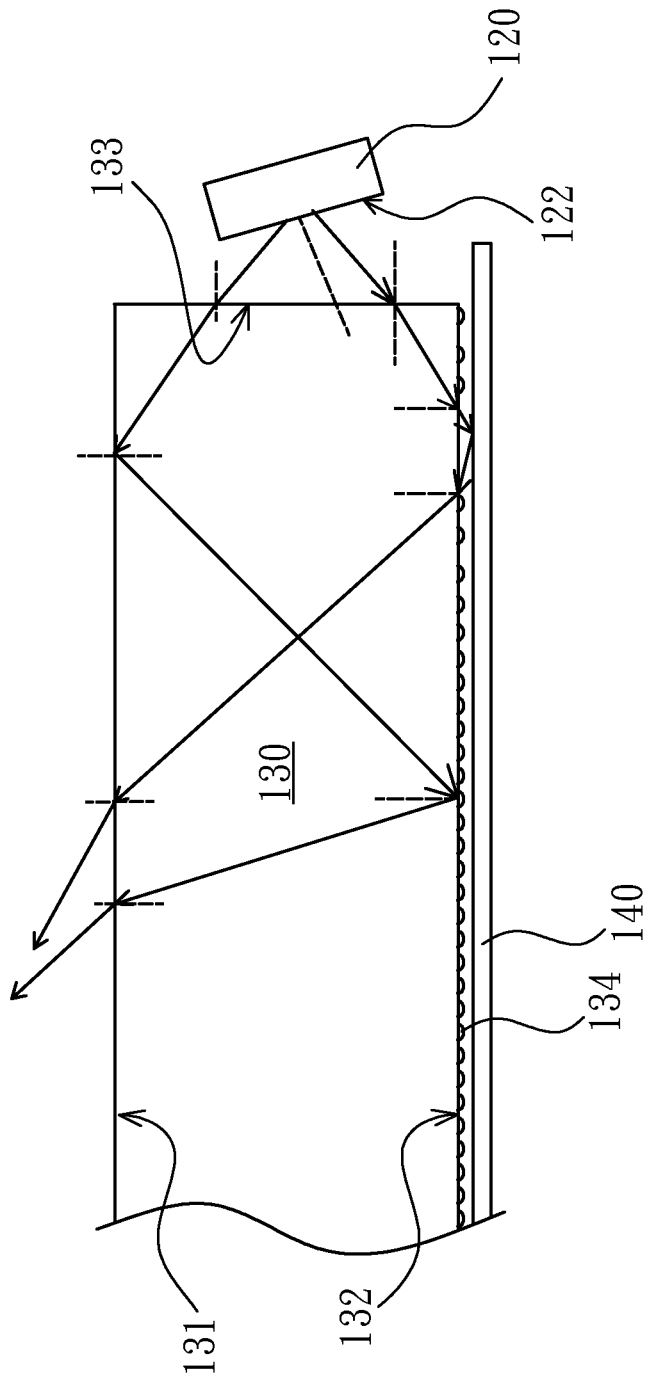
FIG. 2 shows a partial sectional diagram of the backlight module according to the first embodiment of the present invention.

Please refer to FIG. 2, which shows a partial sectional diagram of the backlight module according to the first embodiment of the present invention. When the light source 120 of the backlight module 100 in this embodiment emits the light to the light guide plate 130, the direction of the light from the light source 120 entering the light guide plate 130 can be changed because the predetermined angle θ exists between the light source out light surface 122 of the light source 120 and the out light surface 131 of the light guide plate 130. Therefore, as the light of the light source 120 travels to the out light surface 131 around the side light incident surface 133, the total reflection may easily happen. In another word, the light at the out light surface 131 around the side light incident surface 133 is not easily emitted out. Therefore, the issue of the light leakage around the side light incident surface 133 of the light source 120 can be reduced to ensure the display quality of the liquid crystal display utilizing the backlight module 100.

Figure 3:
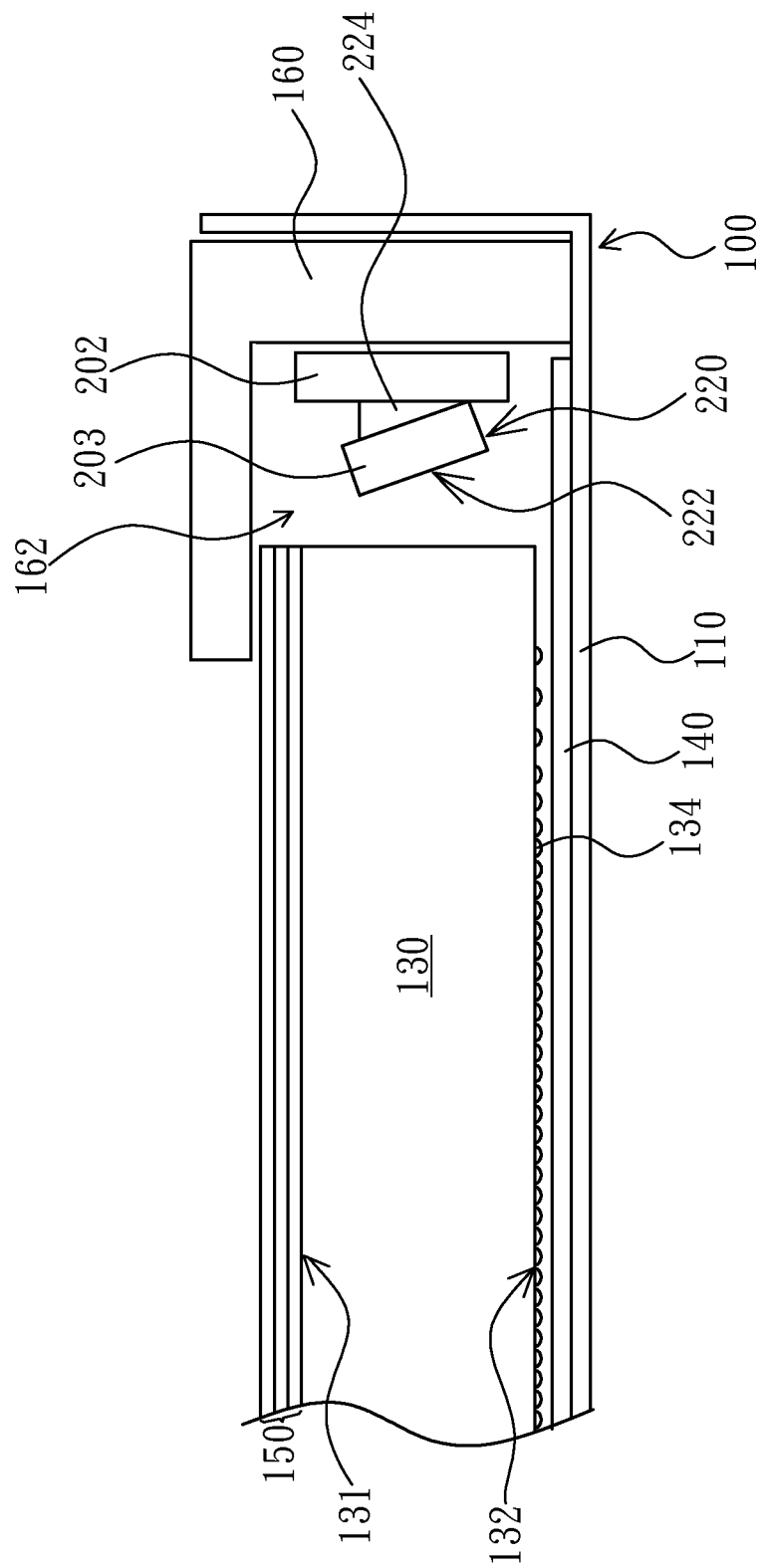
FIG. 3 shows a partial sectional diagram of the backlight module according to the second embodiment of the present invention.

Please refer to FIG. 3, which shows a partial sectional diagram of the backlight module according to the second embodiment of the present invention. Below will be descriptions for the differences of this embodiment from the first embodiment. Other similar portions will be omitted. Comparing with the first embodiment, the light source 220 further comprises a lead frame 224 for supporting and carrying the light source 220. The lead frame 224 can be employed for tilting the light source 220 to form the predetermined angle θ existing between a light source out light surface 222 of the light source 220 and the out light surface 131 of the light guide plate 130. In this embodiment, the light source 220 comprises a circuit board 202, a light emitting element 203 (such as LED chips), the light source out light surface 222 and the lead frame 224. The lead frame 224 can be a frustum frame positioned between the circuit board 202 and the light emitting element 203 to support and tilt the light emitting element 203. The light source out light surface 222 is formed on the surface of the light emitting element 203. Therefore, the predetermined angle θ can be formed to exist between the light source out light surface 222 of the light source 220 and the out light surface 131 of the light guide plate 130 with the lead frame 224.

Figure 4:
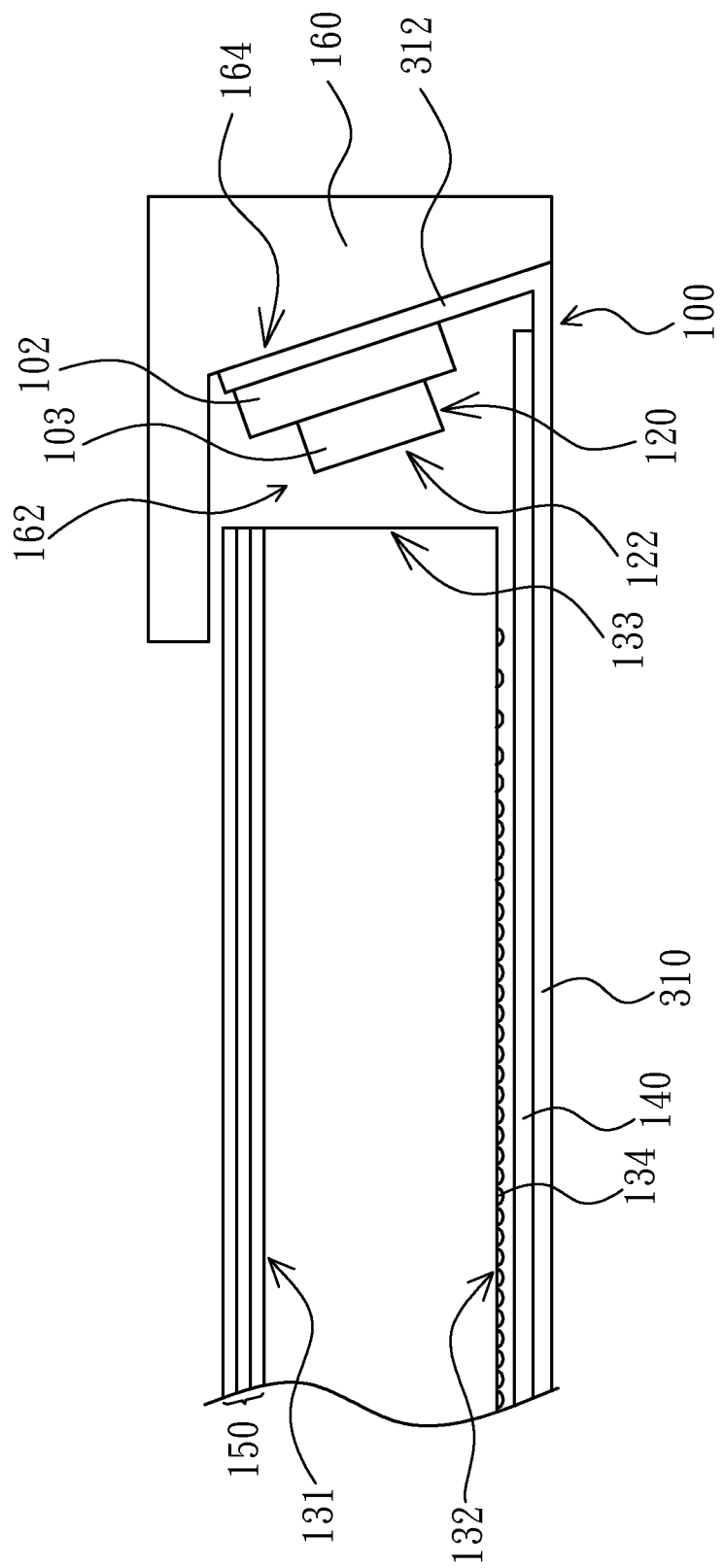
FIG. 4 shows a partial sectional diagram of the backlight module according to the third embodiment of the present invention.

Please refer to FIG. 4, which shows a partial sectional diagram of the backlight module according to the third embodiment of the present invention. Below will be descriptions for the differences of this embodiment from the first embodiment. Other similar portions will be omitted. Comparing with the first embodiment, the back plate 310 of the third embodiment further comprises a back plate tilted surface 312. The back plate tilted surface 312 is formed by bending, tilting and extending one side of the back plate 310. An angle exists between the back plate tilted surface 312 of the back plate 310 and the out light surface 131 of the light guide plate 130. The aforesaid angle equals to the predetermined angle θ. The back plate tilted surface 312 is employed for attaching and installing the light source 121. Therefore, by employing the back plate tilted surface 312 of the back plate 310, the aforesaid predetermined angle θ can be existed between the light source out light surface 122 of the light source 120 and the out light surface 131 of the light guide plate 130.

As aforementioned, the backlight module and the display apparatus of the present invention can change the incident direction of the light entering the light guide plate through the position arrangement of the light source to make total reflection happened to the light around the out light surface of the light source easily and the light not easily emitted out, therefore, to reduce the issue of the light leakage of the light guide plate around the light source. Accordingly, the light leakage issue of the backlight module can be promoted and the display quality of the display apparatus which utilizes the backlight module can be ensured.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A display apparatus, characterized in that the display apparatus comprises:
    a display panel; and
    a backlight module, comprising:
        a light guide plate, having an out light surface; and
        a light source, positioned at a side of the light guide plate, wherein the light source comprises a light source out light surface, and a predetermined angle exists between the light source out light surface and the out light surface of the light guide plate, and the predetermined angle is smaller than or equal to 105 degrees;
    wherein the backlight module further comprises a housing having a housing tilted surface for installing the light source, and an angle exists between the housing tilted surface and the out light surface of the light guide plate, which equals to the predetermined angle, and the predetermined angle exists between the light source out surface of the light source and the out light surface of the light guide plate is configured to change an incident direction of a light from the light source entering the light guide plate, and a position arrangement of the light source is configured to make the light entering the light guide plate through the position arrangement totally reflect around the out light surface of the light source and to prevent the light from emitting out the housing.

2. A display apparatus, characterized in that the display apparatus comprises:
    a display panel; and
    a backlight module, comprising:
        a light guide plate, having an out light surface; and
        a light source, positioned at a side of the light guide plate, wherein the light source comprises a light source out light surface, and a predetermined angle exists between the light source out light surface and the out light surface of the light guide plate, and the predetermined angle is smaller than or equal to 105 degrees, and the predetermined angle exists between the light source out surface of the light source and the out light surface of the light guide plate is configured to change an incident direction of a light from the light source entering the light guide plate, and a position arrangement of the light source is configured to make the light entering the light guide plate through the position arrangement totally reflect around the out light surface of the light source and to prevent the light from emitting out the housing.

3. A backlight module, characterized in that the backlight module comprises:
   a light guide plate, having an out light surface;
   a light source, positioned at a side of the light guide plate, wherein the light source comprises a light source out light surface, and a predetermined angle exists between the light source out light surface and the out light surface of the light guide plate, and the predetermined angle is smaller than or equal to 105 degrees; and
   a lead frame employed for tilting the light source to form the predetermined angle,
       wherein the predetermined angle exists between the light source out surface of the light source and the out light surface of the light guide plate is configured to change an incident direction of a light from the light source entering the light guide plate, and a position arrangement of the light source is configured to make the light entering the light guide plate through the position arrangement totally reflect around the out light surface of the light source and to prevent the light from emitting out the housing.

4. The backlight module of claim 3, characterized in that the light source out light surface of the light source is perpendicular to an incident direction of a light entering the light guide plate.

5. The backlight module of claim 3, characterized in that the light source comprises a LED chip and the light source out light surface is formed on a surface of the LED chip.

6. The backlight module of claim 3, characterized in that the material of the light guide plate is Polymethylmethacrylate and the predetermined angle is smaller than or equal to 95.68 degrees.

7. The backlight module of claim 3, characterized in that the material of the light guide plate is Polycarbonate and the predetermined angle is smaller than or equal to 101.82 degrees.

8. The backlight module of claim 3, characterized in that the backlight module further comprises a housing having a housing tilted surface for installing the light source, and an angle exists between the housing tilted surface and the out light surface of the light guide plate, which equals to the predetermined angle.

9. The backlight module of claim 3, characterized in that the backlight module further comprises a back plate having a back plate tilted surface for installing the light source, and an angle exists between the back plate tilted surface and the out light surface of the light guide plate, which equals to the predetermined angle.

* * * * *